United States Patent [19]

Malone et al.

[11] 3,973,131
[45] Aug. 3, 1976

[54] PULSED NEUTRON LOGGING: MULTIPURPOSE LOGGING SONDE FOR CHANGING TYPES OF LOGS IN THE BOREHOLE WITHOUT BRINGING THE SONDE TO THE SURFACE

[75] Inventors: Steve G. Malone; Obie M. Langford, both of Houston, Tex.

[73] Assignee: Texaco Inc., New York, N.Y.

[22] Filed: Dec. 26, 1974

[21] Appl. No.: 536,532

[52] U.S. Cl. .............................. 250/502; 250/267; 250/270
[51] Int. Cl.² ...................... G21G 4/02; G01V 5/00
[58] Field of Search ........... 250/270, 262, 502, 267; 328/109

[56] References Cited
UNITED STATES PATENTS

| | | | |
|---|---|---|---|
| 2,820,896 | 1/1958 | Russell et al. | 328/109 |
| 2,991,364 | 7/1961 | Goodman | 250/262 |
| 3,215,836 | 11/1965 | Frey | 250/270 |
| 3,461,291 | 8/1969 | Goodman | 250/270 |

*Primary Examiner*—Harold A. Dixon
*Attorney, Agent, or Firm*—T. H. Whaley; C. G. Ries; William J. Beard

[57] ABSTRACT

Disclosed is a system for nuclear well logging in which neutron pulse time duration for a high energy neutron generator and the frequency of pulses are selected downhole in the tool by use of a coded signal transmitted by the cable from the earth's surface. Separate channel systems are provided in the downhole tool for desired neutron pulse width and repetition frequency and are operated by a decoder system. Additionally, the accelerator voltage on a high energy neutron generator is controlled by a downhole switching system to selectively obtain different neutron output in response to coded signal transmissions. Moreover, provisions for obtaining different timing pulses to control gates for sampling signals generated in the tool are provided.

15 Claims, 7 Drawing Figures

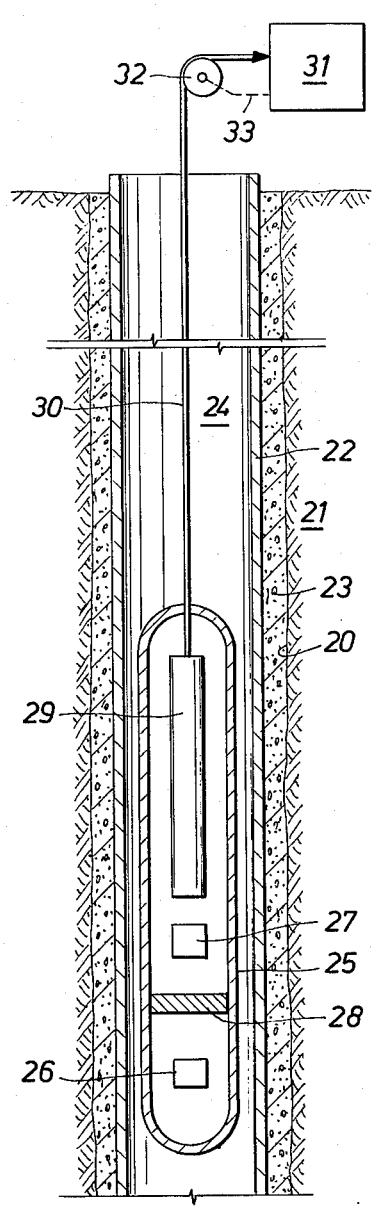
FIG.1
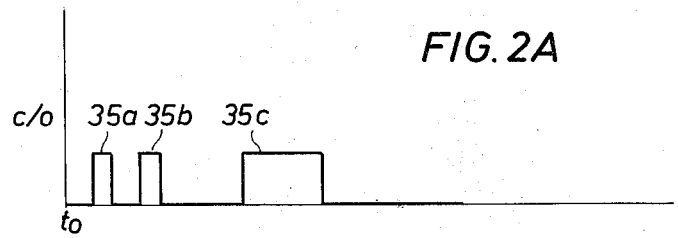
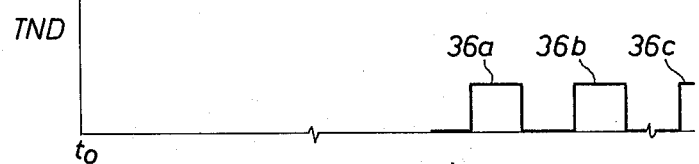
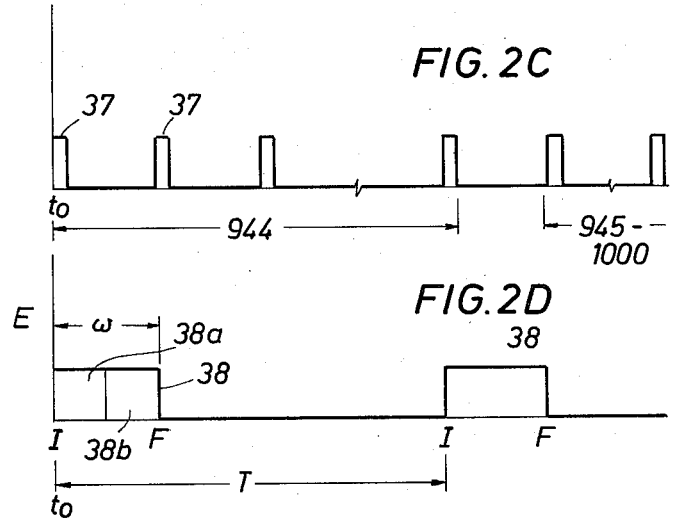
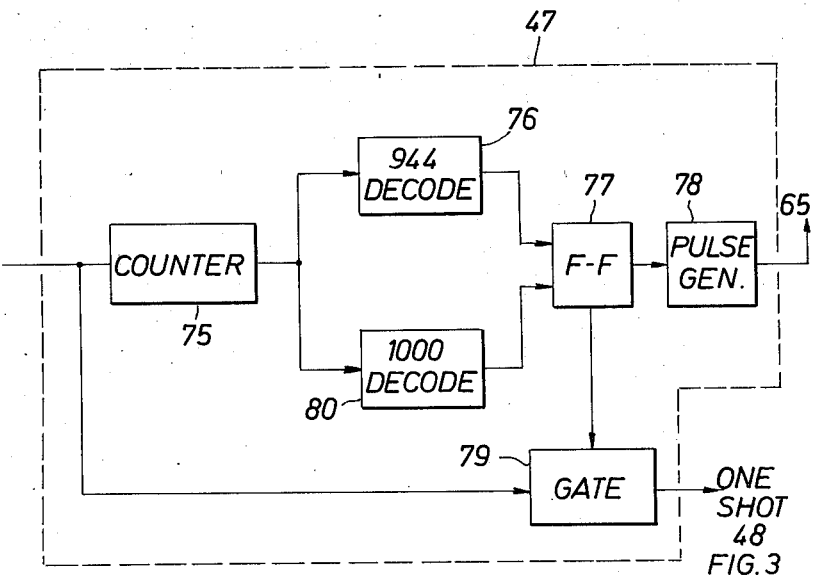
FIG.4

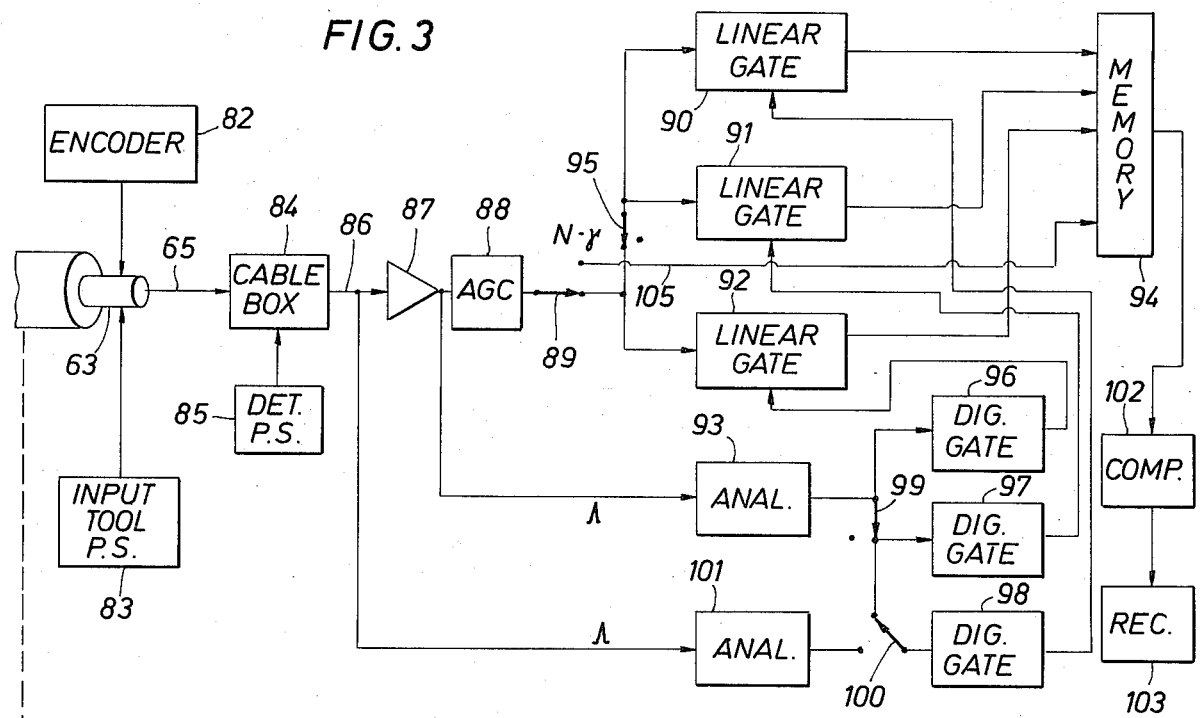
FIG. 3
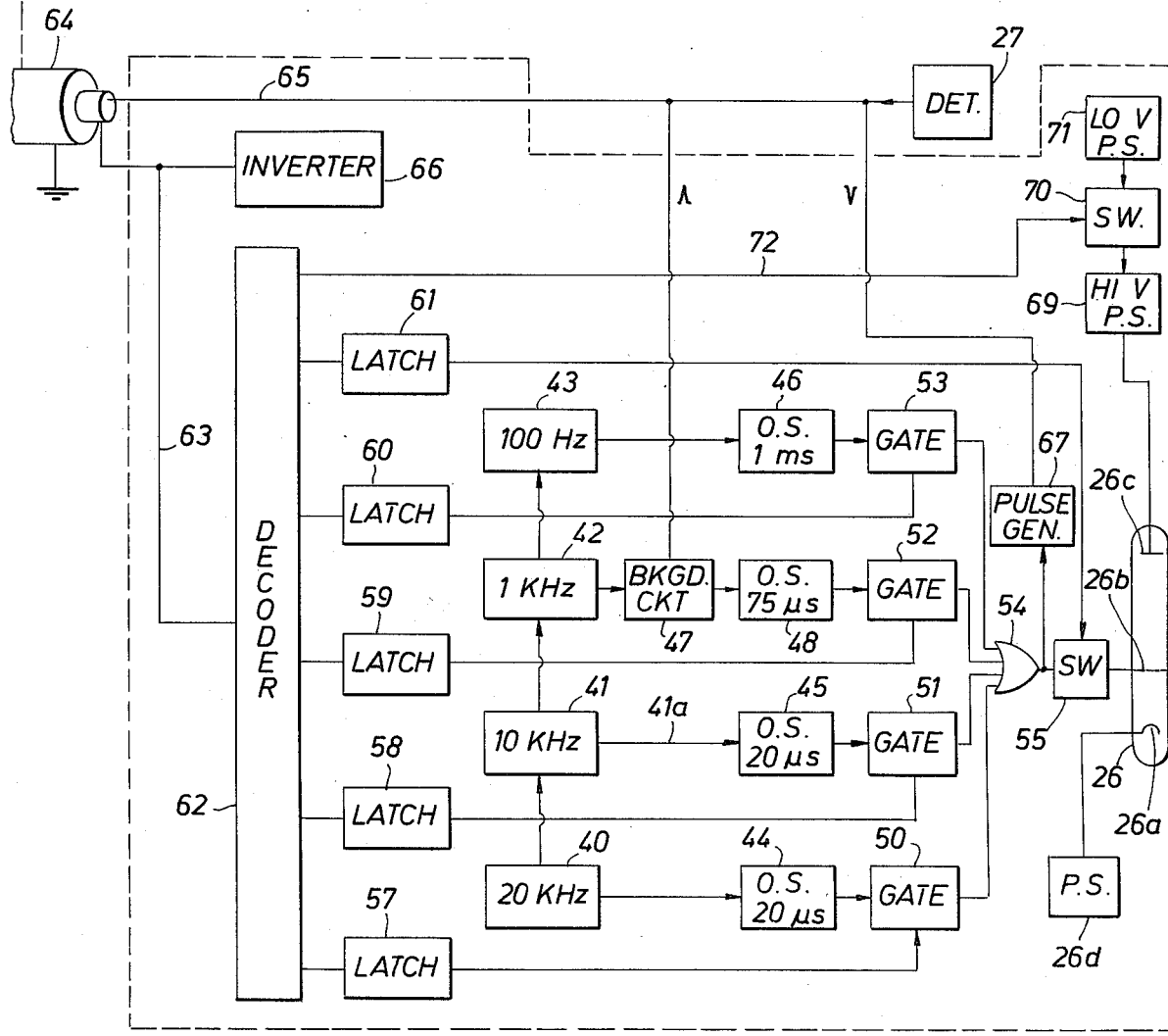

PULSED NEUTRON LOGGING: MULTIPURPOSE LOGGING SONDE FOR CHANGING TYPES OF LOGS IN THE BOREHOLE WITHOUT BRINGING THE SONDE TO THE SURFACE

FIELD OF THE INVENTION

This invention relates to pulsed neutron logging tools for use in well bores, and more particularly, to a system for switching functions of a downhole pulsed neutron tool for obtaining measurements of different earth formation properties without requiring separate cable conductors or removing the tool from the well bore.

BACKGROUND OF THE INVENTION

In the search for earth formations containing hydrocarbons, a well bore is drilled and instruments are passed along the well bore to make measurements. From the measurements, the formation lithology, porosity, and other factors from which the presence of hydrocarbons can be deduced are measured. More often than not, several different types of measurements are necessary for formation analysis and it is necessary to obtain multiple types of measurements with separate tools. When logging tools are run separately, there is always a problem of correlating the depth in addition to the time consumed in removing and rerunning other tools. The loss of valuable rig time is an important commercial consideration. Where a single tool obtains multiple measurements, there is the problem of communication of power and signals between the surface and the tool over the electrical logging cable. For nuclear well logging, it is desirable to use a type of cable as disclosed in a copending application entitled "Well Logging System and Method Using An Armored Coaxial Cable and Compensation Circuit", Ser. No. 192,883 filed Oct. 27, 1971 and which is assigned to the assignee of the present invention. This is a triaxial (or armored coaxial) type of cable and it has desirable bandwidth capabilities for enhancing the measurement and preserving the shape of electrical pulses generated in the downhole equipment. As would be expected with this type of cable which has a limited number of conductors, certain types of measurements cannot be simultaneously made. In nuclear logging, for example, it is desirable to have a capability for obtaining a carbon/oxygen log and a thermal neutron decay time log on one pass through the well bore. While the equipment for obtaining these logs is similar, there are different neutron pulse frequencies, operating voltages, voltages and timing functions, so that obtaining both logs with one run of the tool requires downhole switching and control functions.

In the practice of the present invention, a logging tool is provided with a high energy neutron generator (14 MeV) and a gamma ray detector. Thus, zones of interest can be found for further measurements related to carbon/oxygen content. This type of measurement is typically run at a much lower logging speed and uses a different neutron pulse duration and frequency.

There are other factors which differentiate a thermal decay tool from carbon/oxygen tool. For example, a C/O tool may have a source detector spacing up to four inches more than a spacing required for a thermal decay tool. In regard to neutron pulse frequency and neutron generator pulse width, a thermal neutron decay time tool can operate at 1 KHz for neutron burst repetition with an ion source duration of 75 microseconds. A C/O tool on the other hand, has a neutron pulse repetition frequency of about 20 KHz and a 20 microsecond ion source pulse width. The measurements of gamma rays for thermal neutron decay time measurements occur at a time after the neutron burst. On the other hand, measurements for C/O ratio are made during the burst of neutron energy since inelastic scattering is measured. One of the advantages of a C/O tool is that it is substantially salinity independent, whereas a thermal neutron decay time tool is limited to areas of fairly high salinity.

SUMMARY OF THE INVENTION

The well logging system of the present invention has a source of high energy neutrons (a D-T reaction accelerator tube) and a gamma ray detector located at a compromise spacing for optimum counting of gamma rays both during a burst of neutrons and after a burst of neutrons. This enables measurement of both thermal neutron decay time and carbon/oxygen ratio. The downhole tool is provided with independent channels which provide operations to generate trigger pulses at different neutron pulse repetition frequencies and to provide desired neutron pulse duration dimensions for each operating frequency. The independent operation channels are selected by use of a control signalling technique which selects one of the channels for operation. A downhole switch is responsive to a control signal for stepwise altering the voltage on the target of the neutron generator tube, thereby controlling the relative number of neutrons generated in each neutron pulse and compensating for the compromise in spacing. In the surface equipment, provision is made by switches for using timing pulses to gate detector signals for each type of measurement.

DESCRIPTION OF THE DRAWINGS

FIG. 1 is a schematic illustration of a logging tool in a well bore environment;

FIG. 2 (A – D) are representative of various timing pulse configurations to illustrate different timing sequences relative to a neutron burst;

FIG. 3 is a schematic illustration of the downhole and surface electronics; and

FIG. 4 is a more detailed illustration of a electronic component of the system illustrated in FIG. 3.

DESCRIPTION OF THE INVENTION

In FIG. 1, a borehole 20 is shown traversing earth formations 21. A steel casing 22 is cemented in place by a column of cement 23 which prevents fluid migration between formations. The casing is filled with a well control fluid 24 such as water, drilling mud or the like. The well tool or sonde 25 is an elongated, fluid-tight enclosure sized to be passed through the well bore. In the well tool 25 is a pulsed source 26 of high energy neutrons (14 MeV) and, above the source 26 is a detector 27 for detecting gamma rays. The pulsed neutron source 26 can be a neutron generator tube such as the Philips type operating from the principle of the deuterium-tritium reaction. The gamma ray detector 27 may be a photomultiplier tube and detector crystal for detecting gamma rays resulting from fast or thermal neutron interaction with the earth formations 21 surrounding the well bore 20. A radiation shield 28 of iron, tungsten or other suitable material is interposed between the neutron accelerator 26 and the detector 27. The detector crystal may comprise a thalium doped, sodium iodide or cesium iodide or other like activated material which can be optically coupled to a photomultiplier tube. The radiation shield 28 reduces the probability of direct irradiation of the detector by neutrons emitted by the source 26.

The detector 27 produces voltage pulses proportional in height to the intensity of the scintillation light flashes, where the intensity of the light flashes is proportional to the energy of the gamma ray causing the light flash. The source 26 is repetitively pulsed to produce bursts of high energy (14 MeV) neutrons. Both the source 26 and detector 27 are associated with a downhole electronic cartridge 29 which controls the operation. The tool 25 is supported in the well bore by an electrical armored cable 30 which houses the electrical conductors, in this case, coaxial conductors as noted above. The cable passes over a surface pulley 32 and electrically connects to the surface instrument 31. A mechanical or an electrical linkage 33 is used to illustrate the connection of the pulley 32 to the surface recorder instrumentation 31 so that a record of the measurements as a function of tool depth can be obtained.

Referring now to FIG. 2, the various wave forms will explain the time difference between thermal neutron decay time gamma ray measurements and carbon/oxygen ratio gamma ray measurements. As shown in FIG. 2A, a carbon/oxygen system employs a background gamma ray time gate 35A, an inelastic neutron interaction time gate 35B for obtaining carbon/oxygen measurements and a capture gamma ray time gate 35C for calcium/silicon lithology measurements. These time gates are within 50μs of the occurrence of the neutron burst at a time $t_0$. That is to say, in a C/O measurement, neutron pulses at a repetition frequency of up to 20 KHz are employed. On the other hand, a thermal neutron decay time log is developed by use of time gates 36(A – C) which are usually chosen to extend for up to several hundred microseconds after the neutron burst time $t_0$. In thermal neutron decay time logging, neutron pulse repetition frequency is usually about 1 KHz. From this illustration, it can be seen that the gating times and pulse repetition rates for these types of measurements are much different. Moreover, in C/O ratio measurements, the neutron pulse duration is about 5 microseconds where in thermal neutron decay time measurements, it is usually about 40 microseconds duration.

For further details of a carbon/oxygen system, reference may be made to U.S. Pat. Nos. 3,780,303, 3,780,302 and 3,780,301. With regard to a thermal neutron decay time logging system, reference may be made to U.S. Pat. No. 3,842,264 for further illustration and explanation.

In FIG. 2C, a timing sequence is illustrated for a thermal neutron decay time log. Repetitive bursts of neutron 37 at a frequency of 1 KHz are generated and between each burst 37, the gates 36A and 36B (FIG. 2B) sample the gamma rays detected. After 944 of such bursts, the system operates for a 55 ms period (equal to 55 neutron bursts) to open the gate 36C and sample background gamma rays. The background gamma ray count is scaled in time and subtracted from the measurements of gates 36A and 36B to derive the thermal neutron decay time for the formations.

Referring now to FIG. 2D, a pulse 38 having a width W repeats at a time interval T. The pulse 38 is representative in the unshaded time period 38A of the ionization time in the neutron generator while the shaded time period 38B is representative of the time of a neutron burst. One of the purposes of the present invention is the provision for selecting both the repetition rate or frequency and the width W of the ion source pulse.

Referring now to the system of FIG. 3, in the downhole tool is the D-T accelerator tube 26 which generally includes a deuterium replenisher 26A, an ion source 26B and a target 26C. The target 26C is connected to a negative high voltage power supply 69. The pulse width and pulse repetition rate of the generator tube can be controlled by the ion source 26B. In the illustrated form of this invention, four channels representing individually controlled pulse repetition frequencies and pulse widths are shown although it will be appreciated that more or less channels can be employed. The frequency for each channel is based upon a master clock circuit 40 which can be operated, for example, at 20 KHz. The clock 40 inputs to a divider circuit 41 which provides an output of 10 KHz. The divider circuit 41 inputs to a second divider circuit 42 which provides an output of 1 KHz. The divider circuit 42 inputs to a third divider circuit 43 which provides an output of 100 Hz. Thus, the circuitry includes four separate frequency outputs, i.e., 20 KHz, 10 KHz, 1 KHz and 100 Hz. The outputs of clock 40 and the divider circuits 41 and 43 respectively are input to one-shot multivibrator circuits 44, 45 and 46. The output of the divider circuit 42 inputs to a background synchronization pulse generator circuit 47 which, in turn, inputs to a one-shot multivibrator 48. Each one-shot multivibrator has a predetermined output pulse configuration which is different and which governs the duration W of the ion source pulse width. Thus, one-shots 44 – 46 and 48 provide four different pulse durations W for the neutron generator tube 26. The outputs of the one-shot multivibrators 44 – 46 and 48 are respectively coupled to AND gates 50 – 53 and the outputs of the gates are connected to a NOR circuit 54.

By selecting one of the AND gates 50 – 53 for operation, one of the predetermined pulse durations W and pulse repetition frequencies is selected. The NOR circuit 54 passes any of the gate outputs to an ion source switch circuit 55 which controls the ion source 26B of the generator 26. The gate selection for AND gates 50 – 53 is made by one of latch circuits 57 – 60. The latch circuits generally function in responding to an input signal to provide a fixed condition output signal which, in effect, opens a gate to permit passage of pulses from a one-shot multivibrator. The latch circuits only reset when the power is discontinued. A separate latch circuit 61 is used to condition the switch circuit 55 to an "on" condition. Each of the latch circuits 57 – 61 has its input connected to a decoder circuit 62. The decoder circuit 62 has a plurality of channels which respond individually to different control signal frequencies. For example, a control signal frequency $f_1$ would produce an output to latch circuit 61, a control signal frequency $f_2$ would produce an output to latch circuit 60 and so forth. The various control signal frequencies fs are supplied to the decoder 62 by a conductor 63 coupled to the inner shield conductor of the triaxial cable 64. A D.C. power invertor 66 for the tool is also connected to the conductor 63 and receives power from a surface power supply 83. The triaxial cable's outer armor layer is electrically grounded. The center conductor 65 of the cable is connected to the detector 27 and supplies operative D.C. power for the detector.

Gamma Ray data pulses from the detector 27 are conducted to the surface on the center conductor of the triaxial cable. The conductor 65 also receives a positive sync pulse from the background synchronization circuit 47 and a negative sync pulse from a synchronization generator circuit 67.

Operating voltage for the target 26C of the neutron generator 26 is provided by a negative 125 Kv high voltage power supply 69. A low voltage power supply 71 is connected via an output voltage switching circuit 70 to the high voltage power supply 69. As will be subsequently discussed, the high voltage produced by the supply 69 is controlled by the input voltage supplied by the low voltage power supply 71. The switch 70 is controlled by an input signal on conductor 72 from the decoder 62. The switching input signal on the conductor 72 is controlled by a control signal frequency input to the decoder 62.

Reviewing the system, a control signal frequency signal $f_1$ first operates the latch 61 which turns the ion source switch 55 to an "on" condition (this condition shown in FIG. 2D as the time from I to F). A second selected control frequency frequency signal $f_2$ operates the latch circuit 57 which in turn, opens the gate 50. Thereafter, the one-shot 44 is triggered by the clock 40 and turns the switch 55 to an "off" condition (this condition shown in FIG. 2D as the time from F to I) for a set time period. Thus, the duration W of the ion source control pulse 38 is controlled by the one-shot circuit 44.

The sync circuits 67 and 47 indicate the occurrence of certain events. The sync circuit 67 produces negative sync pulses for each burst of neutrons at the time I (see FIG. 2D). The sync circuit 47 indicates for thermal decay logging when the background gamma rays are to be counted.

This system also has the ability of varying the neutron output at different levels while the tool is operating in a borehole. This feature is important because for certain logs, pulse pile up (i.e., a too high instantaneous counting rate of gamma rays) in the detector system must be minimized by reducing the neutron output. Generally the neutron output may be reduced by changing the source-to-detector spacing. This action is normally prohibited in a borehole because of the need for maximum shielding. In the present system the neutron output is changed by varying the target voltage (and hence target current). Since the neutron output is related to the target current or voltage, the magnitude of these currents can be stepped down electronically to correspond to predetermined percentages of the maximum neutron output. For the system shown in FIG. 3, the neutron output is reduced by changing a 50 volt input voltage in supply 71 to change the negative 125 KV high voltage target voltage supplied by power supply 69.

This is accomplished by sending a selection control signal to the 50 volt power supply switch 70. This switch 70 is programmed to reduce the target voltage by reducing the input voltage from the low voltage power supply 71 to the high voltage power supply 70 in predetermined steps. Once the proper level of voltage is selected, the switch 70 holds that position until the tool power is shut off or additional selection control signals are received to reposition the switch. The switch 70 is programmed to reset itself automatically once a cycle of different levels of voltages has been completed. This feature allows the operator to observe the response at several levels and choose the best neutron output for his application.

Turning now to the surface equipment, an encoder for developing the various control signal frequencies is connected to the inner shield conductor 63. The center conductor 65 is connected to a cable box circuit 84 which separates sync pulses and data signals from power supply voltages. D.C. power for operation of the detector 27 is supplied by the surface detector power supply 85. Data pulse signals and sync pulses from the tool are supplied via a conductor 86 to an amplifier 87 and automatic gain control circuit 88 which linearizes the signals. An output from the AGC circuit 88 passes through a log selector switch 89, in the position shown, to linear gates 90, 91 and 92. The linear gates serve to pass the signal in an unchanged condition or prevent passage therethrough. In other words, the pulse height information in the data pulses is not disturbed. Each of the gates 90 – 92 is connected to a buffer memory circuit 94. A linear gate selector switch 95 is disposed between the log selector switch 89 and the linear gates 90 and 91 and can be operated to disconnect the gates 90 and 91 from the log selector switch 89.

Output from the amplifier 87 is supplied to a first single channel analyzer 93. The single channel analyzer 93 responds only to the voltage height of the sync pulse from the sync pulse generator 67 and triggers digital gates 96, 97 and 98. The amplitude of the sync pulses is chosen such that data pulses will not trigger an analyzer. The digital gates 96 – 98 serve to open the respective linear gates 90 – 92 for passage of data pulses therethrough at desired time intervals for a particular type of log. The digital gate is manually adjustable to provide square wave output voltage levels of variable duration and initiation time. Between the analyzer 93 and gates 97 and 98 is a digital gate selector switch 99 which can be operated to disconnect the output of these digital gates from the analyzer 93.

The output of cable box circuit 84 is also connected to a single channel analyzer 101 which is set to detect positive sync pulses only from the downhole sync generator circuit 47. The sync pulses from generator 67 are still negative on conductor 86 prior to their entry into amplifier 87 and are thus discriminated against by analyzer 101. A background switch 100 connects the output of either the analyzer 93 or the analyzer 101 to the digital gate 98. The output of the buffer memory 94 is supplied to a computer 102 for deriving the desired ratio thermal neutron decay time, or neutron gamma ray log measurements from the gamma ray data. The recorder 103 provides a log or record as a function of depth.

With the tool in the hole for a thermal neutron decay time log, the encoder 82 at the surface provides the frequency control signal to the downhole decoder 62 to operate latch 61 which supplies a voltage to the ion source switch 55 and the ion source 26B. This is a condition for a continuous logging operating such as N-γ logging. To operate in a pulse node for a thermal neutron decay log, a frequency control signal is used to operate the latch 59. All of the AND gates 50, 52 and 53 are closed while the output of the latch 59 opens the AND gate 52. Referring to FIG. 4 for details of the background sync circuit 47 of FIG. 3 may be seen. The 1 KHz output from the divider circuit 42 is supplied to the counter 75 and is passed through the gate 79 to the one-shot circuit 48 of FIG. 3. The one-shot circuit 48 output controls the duration of the neutron pulse generated by generator tube 26. The sync circuit 67 provides a negative sync pulse on conductor 65 for each operation of the one-shot circuit 48. Referring again to FIG. 4, when the counter 75 counts 944 neutron input pulses, the decoder circuit 76 sets flip-flop 77 which intercepts the initiating pulse to the one-shot circuit 48 via gate 79. The pulse generator 78 in response to the setting of the flip-flop 77 provides a positive sync pulse on the conductor 65 indicating the initiation of a background gamma ray counting period. Upon counter 75 reaching a count of 1000 pulses, the decoder 80 resets the flip-flop 77 so that the neutron pulsing is resumed. Both positive and negative sync pulses and the detected gamma ray pulses are transmitted via cable center conductor 65 to the surface equipment. In the surface equipment, the background switch 100 is in position to connect the analyzer circuit 101 to the gate 98. All other surface switches are in the position shown. The negative sync pulse from circuit 67 is detected and operates gates 96 to provide a time gate 36A (FIG. 2B) and operates gate 97 to provide a time gate 36B (FIG. 2B) so that the detected pulses pass through the gates 90 and 91 to the buffer memory 94 during the open times 36A and 36B. When the positive sync pulse from circuit 47 arrives, it activates analyzer 101 and the gate 98 is operated for the open period of the time gate 36C (FIG. 2B). The buffer memory 94 provides input data to a computer 102 which calculates macroscopic thermal neutron decay time or capture cross-section values.

For operation to obtain a C/O log after the thermal decay log is recorded, the tool is repositioned as desired in the bore hole. The electrical power is interrupted to drop out the latchs 59 and 61. Frequency control signals from the surface encoder 82 then are sent to operate the latchs 61 and 57 in sequence. This conditions the neutron generator 26 and opens the gate 50. The subsequent pulses from clock 40 operate the one-shot circuit 44 at 20 KHz frequency and hold the pulse duration of the ion source to 20 microseconds. Negative sync pulses from the circuit 67 are repetitively supplied to the surface equipment. At the surface, the background switch 100 is in the illustrated position. Thus, for each sync pulse, the gates 96, 97 and 98 produce the gating time pulses 35 (A–C) for sampling the gamma ray data pulses input to the linear gates 90, 91 and 92. The data pulses from gates 90, 91 and 92 are transmitted to the memory 94 where they are available to the computer 102 and buffer for processing and subsequent recording by the recorder 103.

The linear gate switch 95 can be operated by movement to disconnect the linear gates 90 and 91 from receiving inputs from the AGC circuit 88. The log selection switch 89 can be operated then to couple data pulses directly to the buffer memory 94 by a conductor 105. In this manner a conventional neutron gamma ray log may also be provided, if desired.

To change the voltage on the generator 26, a frequency control signal is transmitted to the decoder 62 which, via a conductor 72, operates the step function switch 70. For each step function, the voltage of the high votlage power supply 69 can be incieased or decreased. For example, the power supply 69 can be 125 Kv and the low voltage power supply 71 can provide 5 volt increments. With a six-position switch, the voltage to the target of generator 26 can be increased five steps to 125 Kv and then revert on the sixth step to 100 Kv.

While a particular embodiment of the present invention has been shown and described, it is apparent that changes and modifications may be made without departing from this invention in its broader aspects; and therefore, the aim in the appended claims is to cover all such changes and modifications as fall within the true spirit and scope of the invention.

What is claimed is:

1. A system for logging well bores with repetitive pulses of high energy neutrons, comprising:
   a fluid-tight logging tool sized and adapted for passage through a well bore by means of an armored electrical cable coupled thereto, said cable having at least one electrical conductor and an electrical ground,
   means in said logging tool for generating repetitive pulses of high energy neutrons in response to input signals,
   at least two channel means respectively for generating input signals at different repetition rates,
   means in said tool for selectively coupling one of said channel means to said neutron generating means,
   means in said tool for generating a high voltage potential for the operation of said neutron generating means;
   means for selectively supplying electrical control signals via said electrical conductor to said logging tool, and
   decoder means in said tool responsive to said control signals for selectively coupling one of said channel means to said high voltage generating means.

2. The apparatus as defined in claim 1 wherein said generating means includes an ion replentisher means, an ion source means and target means, said ion source means being coupled by said selective coupling means to one of said channel means.

3. The apparatus as defined in claim 2 and further including means for discretely changing the magnitude of voltage applied to said target means, said decoder means being coupled to said discrete changing means for operating said changing means in response to control signals supplied to said decoder means.

4. The apparatus as defined in claim 2 and further including means for applying a control voltage to said ion source means, said decoder means being coupled to said applying means for operating said applying means in response to control signals supplied to said decoder means, said channel means and said applying means cooperating for defining the pulse width of the ion source.

5. The apparatus as defined in claim 4 wherein said channel means provides input signals for disrupting control voltage to said ion source means.

6. The apparatus as defined in claim 4 wherein each of said channel means and said applying means cooperate for defining different pulse widths of the ion source.

7. The apparatus as defined in claim 5 and further including gate means in each of said channels for controlling the passage of signals therethrough, latch means for controlling the operation of each of said gate means, said decoder means being coupled to said latch means for selectively operating said latch means in response to control signals supplied to said decoder means.

8. The apparatus as defined in claim 6 and further including means for generating first sync pulses indicative of the operation of said ion source.

9. The apparatus as defined in claim 8 and further including in one of said channel means, means for generating second sync pulses indicative of a time period for measuring background radiation.

10. A system for logging well bores with repetitive pulses of high energy neutrons, comprising:
a fluid-tight logging tool sized and adapted for passage through a well bore by means of an armored electrical cable coupled thereto, said cable having at least one electrical conductor and an electrical ground,
means in said logging tool for generating repetitive pulses of high energy neutrons in response to input signals,
means in said tool for generating a high voltage potential for the operation of said neutron generating means;
at least two channel means respectively for generating input signals at selected repetition rates and for providing different time durations for the generation of said repetitive pulses,
means in said tool for selectively coupling one of said channel means to said neutron generating means,
means for selectively supplying selection control signals via said cable conductor to said logging tool, and
decoder means in said tool responsive to said control signals for selectively coupling one of said channel means to said high voltage generating means.

11. The apparatus as defined in claim 10 wherein said generating means includes a target, an ion source and ion replentisher means, means for selectively altering the voltage of said voltage means, said altering means being coupled to said decoder means and responsive to control signals for altering the voltage of said voltage means.

12. A system for logging well bores with repetitive pulses of high energy neutrons, comprising,
a fluid-tight logging tool sized and adapted for passage through a well bore by means of an armored electrical cable coupled thereto, said cable having first and second conductors and an electrical ground,
means at the surface of the earth for generating discrete selection control signals for transmission via said first conductor to said tool,
decoder means in said tool for receiving said selection control signals and for providing discrete down-hole control signals,
neutron generating means including a target means, an ion source means, and replentisher means,
means responsive to one of such discrete downhole control signals for applying control voltage to said ion source means,
at least two channel means respectively for generating signals to disrupt said control voltage thereby defining the operating pulse widths of the ion source,
means for generating first negative sync pulses indicative of operations of said ion source,
means responsive to one of such discrete downhole control signals for coupling one of said channel means to said ion source,
detector means for detecting gamma ray energy and for producing data pulse signals, said gamma ray signals and said sync pulses be transmittable to the earth's surface via said second conductor to said tool,
amplifier means at the earth's surface for receiving said data pulse signals and said sync signals,
buffer memory means at the earth's surface for receiving said data pulse signals, and
surface means for processing and recording said data pulse signals as a function of depth.

13. The apparatus as defined in claim 12 and further including first linear gate means between said amplifier and buffer means for passing data pulse signals, digital gate means for controlling the time interval of operation for said linear gate means,
means for receiving said sync pulses and for operating said digital gate means.

14. The apparatus as defined in claim 13 and further including second and third linear gate means respectively between said amplifier and buffer means, second and third digital gate means respectively for controlling the time interval of operation for the respective linear gate means,
said sync receiving means being selectively connectable to said digital gate means.

15. The apparatus as defined in claim 14 and further including in one of the channel means, means for developing a second sync pulse and control for detecting background gamma rays, said second sync pulse and data pulses representative of background gamma rays being transmittable on said second conductor,
means at the earth's surface for receiving said second sync pulses, said second sync pulse means being selectively connectable to said third digital gate means for measuring background gamma ray data.

* * * * *